Patented June 30, 1931

1,812,497

UNITED STATES PATENT OFFICE

GEORGE FLETCHER RANSOM, OF SAN ANGELO, TEXAS, ASSIGNOR TO HUMBLE OIL & REFINING COMPANY, OF HOUSTON, TEXAS, A CORPORATION OF TEXAS

RECOVERY OF POTASSIUM SULPHATE FROM POLYHALITE

No Drawing. Application filed June 22, 1927. Serial No. 200,767.

This invention relates to a new method of treating potash minerals of the tribasic and dibasic type, such as, for instance, polyhalite, krugite, and langbeinete, for the purpose of manufacturing from these a product relatively high in potash content and free from objectionable quantities of magnesium and calcium salts.

Heretofore these minerals and especially polyhalite have been undeveloped as a source of potash, because there was no known process for its recovery, purification and concentration at a cost that would permit its use.

The fact that the United States has been and is still dependent on the European supply of potash for the greater part of its requirements, although large sums of money have been spent and much work done to relieve this condition, while extensive beds of polyhalite exist in the States of Texas and New Mexico, shows the vital need of a process that will enable us to commercialize these deposits.

Polyhalite has the following chemical composition: $2CaSO_4.MgSO_4.K_2SO_4.2H_2O$. The difficulty heretofore has been the elimination of the magnesium and calcium sulphates from the potassium sulphate.

It is an object of the invention to provide a process for the recovery, purification and concentration of potassium sulphate from the mineral polyhalite and other potash minerals of kindred composition.

In carrying out my process, I grind the mined mineral polyhalite to a fineness suitable to promote quick extraction of the more readily soluble constituents by water. I prefer a fineness whereby the ground mineral will pass a screen having 60 meshes to the linear inch.

I then mix the ground mineral with lime either in the form of calcium oxide or calcium hydrate and in a proportion that will supply calcium in amount chemically equivalent to that of the magnesium in the mineral.

I then digest this mixture of ground mineral and lime with just enough water to effect solution of the potash salt or only enough excess to facilitate manipulation. I prefer hot water in digesting the mixture in order to facilitate solution.

The lime in the mixture reacts upon the magnesium sulphate as it goes into solution and precipitates the magnesium, as magnesium hydrate and the sulphate radical as calcium sulphate, which are both practically insoluble in water and less soluble in the presence of other salts in solution, thus eliminating the magnesium and the sulphate radical from the solution which contains the potash salt.

The lime might be added after the solution of the various soluble salts from the polyhalite and still eliminate the magnesium, but another and valuable advantage is gained by effecting this solution in the presence of the lime; in that, the sulphate radical is eliminated from the solution as fast as dissolved. By thus preventing any considerable amount of magnesium sulphate from being in the solution, the potassium sulphate dissolves more readily and in a smaller quantity of water. By this means the operation becomes more rapid and the costs are reduced by lessening the volume of solution to be handled and the amount of evaporation required.

The solution thus obtained I separate from the undissolved residue in any suitable manner, such as filtration.

This solution, freed from the magnesium salt and containing the potash salt together with some calcium sulphate, and calcium hydrate, I now evaporate to expel the water and use the dehydrated salts as a fertilizing material.

If further purification of the product is desired, I accomplish this by the treatment of the solution before evaporation, as hereinafter explained, so as to eliminate a portion of the calcium and recover the further purified potash salt by evaporation.

To further purify the solution obtained by digesting the mixture of ground mineral and lime, containing potassium sulphate, calcium sulphate and calcium hydrate, I pass carbon dioxide into the solution, preferably after the solution has been separated from the insoluble residue, until all the calcium hydrate in solution has been precipitated as calcium carbonate which I remove by filtration.

The solution thus freed from the calcium hydrate, now containing the potash salt, and a very little calcium sulphate, I evaporate to recover the comparatively pure potash salt.

The carbon dioxide used to react on the calcium hydrate and precipitate it as carbonate may be obtained from the kilns in which the lime is burned for use in mixing with the ground mineral.

In substance, the process is to extract the potash salt by breaking up the compound salt by the action of water and to extract the potash salt by solution with as little solution of the calcium sulphate as possible; to facilitate the solution of the potash salt by precipitation of the magnesium as hydrate as fast as it goes into solution; to eliminate the magnesium from the final product by precipitation as hydrate; and the separation of the purified solution from the undissolved residue and the precipitated magnesium; and to eliminate the dissolved calcium hydrate by precipitating as carbonate; and finally the recovery of the purified potash salt by evaporation. The process is not a difficult or costly one and is capable of operation with simple and economical installations of equipment.

My invention therefore provides a much needed cheap process for the recovery of potassium sulphate from polyhalite. It makes available for the American market the enormous deposits of potash minerals in the United States that were heretofore unprofitable to develop and inaugurates a new manufacturing art.

Having thus described my invention, what I claim as new and desire to protect by Letters Patent is:

The process of recovery of potash salts from polyhalite comprising grinding and comminuting the ore, mixing lime therewith in amount approximately equivalent to the magnesium content of the ore, digesting the mixture in its original condition with hot water to dissolve the potash salts, simultaneously precipitating the magnesium sulphate, removing the precipitate, treating the solution with carbon dioxide to precipitate a portion of the lime, and then evaporating the remaining solution.

In testimony whereof I hereunto affix my signature this 7th day of June, A. D. 1927.

GEORGE FLETCHER RANSOM.